United States Patent [19]
Hendershot et al.

[11] Patent Number: 5,762,094
[45] Date of Patent: Jun. 9, 1998

[54] AUTOMATIC VALVE DRAIN

[75] Inventors: Gary Hendershot, Amherst; Duane R. Johnson, Wellington, both of Ohio

[73] Assignee: AlliedSignal Truck Brake Systems Co., Elyria, Ohio

[21] Appl. No.: 827,754

[22] Filed: Apr. 11, 1997

[51] Int. Cl.$^6$ .................................................. F15B 13/042
[52] U.S. Cl. ........................................ 137/204; 137/627.5
[58] Field of Search ................................. 137/204, 627.5

[56] References Cited

U.S. PATENT DOCUMENTS

| | | |
|---|---|---|
| 3,227,495 | 1/1966 | Bueler ............................. 137/627.5 X |
| 3,525,555 | 8/1970 | Meyer et al. ..................... 137/627.5 X |
| 3,659,625 | 5/1972 | Coiner et al. . |
| 3,799,186 | 3/1974 | Bulin . |
| 3,845,778 | 11/1974 | Bridigum . |
| 3,920,046 | 11/1975 | Morse et al. ........................ 137/627.5 |
| 4,069,745 | 1/1978 | Stinson . |
| 4,222,403 | 9/1980 | Sonoda . |
| 4,336,821 | 6/1982 | Frantz et al. . |
| 4,620,567 | 11/1986 | Kurtz ................................. 137/627.5 |
| 4,922,947 | 5/1990 | Champseix . |
| 4,928,724 | 5/1990 | Margerum . |
| 5,205,315 | 4/1993 | Margerum . |
| 5,261,458 | 11/1993 | Johnson et al. . |
| 5,346,291 | 9/1994 | Marsh et al. ..................... 137/627.5 X |
| 5,435,422 | 7/1995 | Chille, Sr. . |
| 5,666,995 | 9/1997 | Herbst et al. ...................... 137/627.5 |
| 5,709,246 | 1/1998 | Koelzer ............................. 137/204 |

FOREIGN PATENT DOCUMENTS

| | | | |
|---|---|---|---|
| 2103524 | 8/1972 | Germany ............................. | 137/203 |
| 2703940 | 8/1978 | Germany ............................. | 137/627.5 |

OTHER PUBLICATIONS

"Relay Valve", From AlliedSignal Truck Brake Systems Catalog 03-B-4D (undated).

*Primary Examiner*—Gerald A. Michalsky
*Attorney, Agent, or Firm*—Howard G. Massung

[57] ABSTRACT

An improved relay valve (10) having a supply port (16), a delivery port (18), an exhaust port (20), a control port (17), a relay piston (14) controlling communication between the supply port (16), the delivery port (18), and the exhaust port (20) in response to a pneumatic signal applied to the control port (17) and including a passage (40) extending through the piston (14) to the exhaust port (20) for draining to atmosphere moisture and other contaminants which build up on the top of the piston (14). A diaphragm element (30) having a cylindrical protrusion portion (36) is disposed in the piston (14) above the passage (40) to act as a check valve and seal the passage (40) when a pneumatic signal is applied to control port (17). The diaphragm element includes a top resilient portion (32) which serves as a spring to open the drain passage when no signal is applied to control port (17). Two flat areas (34) are provided on the top resilient portion (32) which prevents the diaphragm element (30) from prematurely sealing the drain hole (40). The cylindrical protrusion (36) keeps the diaphragm element (30) properly aligned in the tapered bore (44) leading to drain hole (40). A retaining ring (42) keeps diaphragm element (30) within the bore (44).

9 Claims, 1 Drawing Sheet

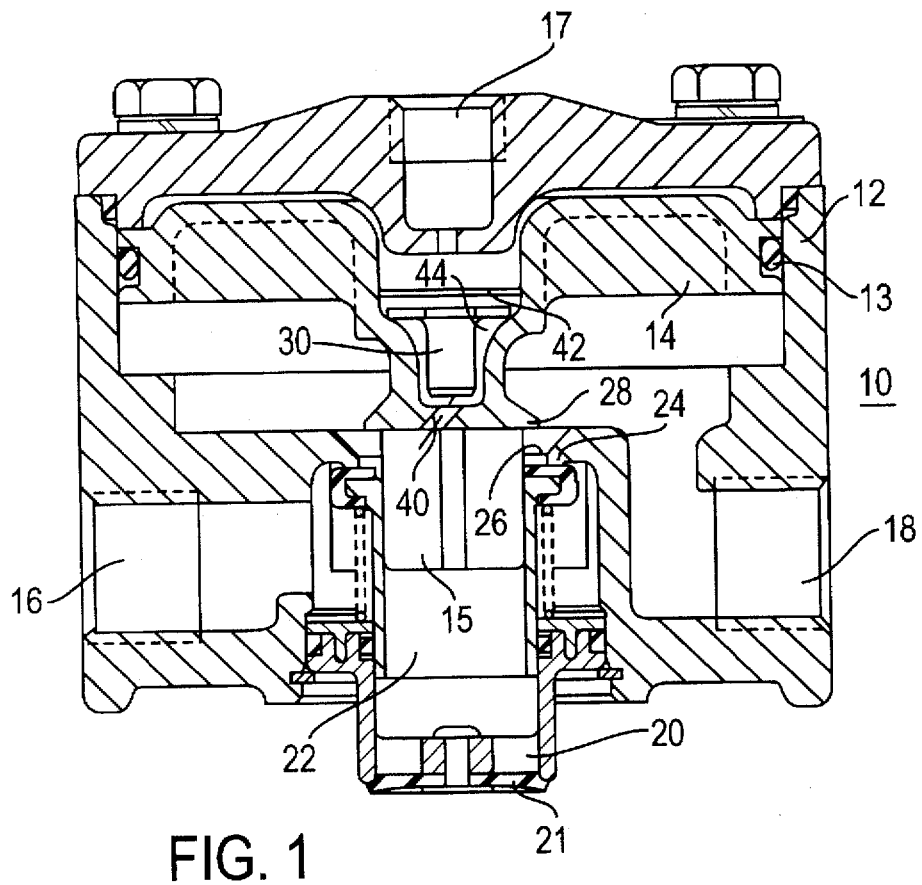
FIG. 1
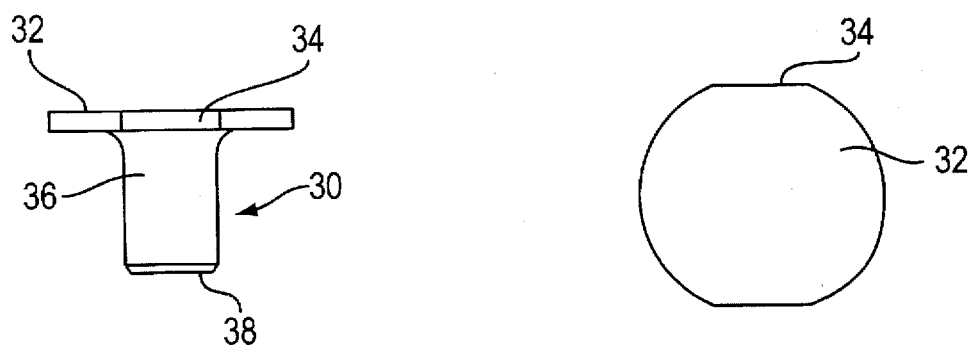
FIG. 2
FIG. 3

AUTOMATIC VALVE DRAIN

BACKGROUND OF THE INVENTION

1. Field of the Invention

This invention relates to pneumatic systems and more particularly to an automatic valve drain for a relay valve used in a pneumatic braking system.

2. Description of Prior Art

The brake systems of many heavy vehicles are actuated by compressed air being introduced into brake chambers. In long wheel base vehicles relay valves are commonly used to apply and release rear axle service or parking brakes. The relay valves have an inlet port, an outlet port, an exhaust port, a control port and a relay control piston operable in response to a pneumatic control signal for controlling communication between the inlet, outlet and exhaust ports. A relay valve, such as the R-12 manufactured by AlliedSignal Truck Brake Systems Company of Elyria Ohio, is an air operated graduating, directional control valve of high capacity and fast response. Upon receipt of signal pressure from a service brake valve, which actuates a relay valve piston, the R-12 relay valve will graduate, hold and release air pressure from the brake chamber to which it is connected. Relay valves are especially needed where large volumes of air are required or long service lines cause the capacity of the brake valve to be exceeded.

One problem associated with any air actuated system is that moisture and other contaminants which are contained within the compressed air condense and accumulate in the system and must be periodically removed for proper operation of the system. Automatic drain valves for periodically draining moisture condensation and other contaminants from compressed air systems are well know in the prior art. U.S. Pat. Nos. 3,845,778; 4,928,724 and 5,435,422 are exemplary of prior art automatic drain valves for removing moisture and contaminants from air pressure reservoirs. U.S. Pat. 4,069,745 discloses a moisture ejector for automatically exhausting accumulated moisture from an air brake actuating chamber.

SUMMARY OF THE INVENTION

The present invention is used in an improved relay valve of a pneumatic braking system to automatically drain liquids such as water or alcohol that build up on the top of the relay valve control piston. The automatic drain utilizes a hole or passage through the relay piston which allows moisture and other contaminates to drain through the piston to an exhaust port when a control signal is not being applied to the relay valve.

The improved relay valve in addition to the passage which extends through the piston member to the exhaust port for draining contaminants which build up on the top of the relay control piston includes a partially flexible diaphragm element for sealing communication to the passage when a pneumatic signal is applied to the control port. When an application of the relay valve is made, the signal air enters the control port and leaks through the drain hole until a differential develops across the diaphragm valve element which then deflects to seal against a tapered bore leading to the drain hole, allowing the relay control piston to operate normally. The diaphragm element has two flats formed on its outer perimeter which prevent the diaphragm from sealing against the tapered bore prematurely. The diaphragm element also serves as a spring element to return to its raised position so the drain valve passage is open when a pneumatic signal is not applied to the control port. The diaphragm element includes a cylindrical protrusion from its center which keeps the diaphragm check valve portion in the proper orientation and location and also serves as a stop to prevent the flexible diaphragm portion from undue stress and premature failure. The drain hole is sized such that even if the diaphragm element is missing reasonable operation of the relay valve will still occur.

BRIEF DESCRIPTION OF DRAWINGS

For a better understanding of the invention reference may be had to the preferred embodiment exemplary of the invention shown in the accompanying drawings in which:

FIG. 1 is an illustration of a pneumatic relay piston valve having an automatic valve drain according to the present invention;

FIG. 2 is a side view of the diaphragm element used in the automatic valve drain; and, FIG. 3 is a top view of the diaphragm element shown in FIG. 2.

DETAILED DESCRIPTION OF THE PREFERRED EMBODIMENTS

Referring now to the drawings and FIG. 1 in particular there is shown an improved pneumatic relay valve 10 which includes an automatic drain in accordance with the present invention. This improved relay valve 10 is particularly suitable for use with pneumatic braking systems used on heavy vehicles. Relay valves are used on long wheel base heavy vehicles to apply and release rear axle and service or parking brakes. The relay valve is used to balance the time of brake application on heavy duty vehicles. Upon receipt of a brake control signal from a service brake valve, the relay valve will graduate, hold and release air pressure from a brake chambers to which it is connected. Relay valves are especially needed where large volumes of compressed air are required or long service lines cause the capacity of the brake valve to be exceeded. The improved relay valve 10 includes a housing 12 within which is slidably mounted in a bore a relay control piston 14. The automatic valve drain of the present invention is formed by the cooperation of a diaphragm element 30 and a passage or drain hole 40 through the middle of relay piston 14.

Relay valve 10 includes an inlet or supply port 16, an outlet or delivery port 18, an exhaust port 20 and a control port 17. Piston 14 is biased upward to the position as shown in FIG. 1 by the exhaust air pressure at delivery port 18 when the pneumatic control signal is removed from control port 17. Piston 14 is maintained in the up position shown in FIG. 1 by the friction between an O-ring 13 and the bore in housing 12. Piston 14 includes a ribbed extension 15 which is slidably received within a hollow valve spool 22. Valve spool 22 is spring biased upward to the position as shown in FIG. 1. Valve spool 22 is hollow which permits communication there through to the exhaust port 20. A conventional resilient member 21 closes the exhaust port but permits pressurized fluids to exhaust out of the port 20 while preventing environmental contaminants from entering the exhaust port 20.

The combination inlet/exhaust valve spool 22 is slidably mounted in a bore connected to exhaust port 20. A spring urges spool 22 upward urging a sealing surface 26 into sealing engagement with a circumferentially extending inlet valve seat 24. The relay piston 14 carries a circumferentially extending exhaust valve seat 28 which is brought into sealing engagement with the sealing surface 26 when communication between the outlet or delivery port 18 is to be shut off from the exhaust port 20.

In operation the various components of relay valve 10 are illustrated in FIG. 1 in the position they assume when pressure at the control port 17 is vented and the brakes are released. In this condition delivery port 18 is in free communication with exhaust port 20. When a brake application is effected, a pressure signal is transmitted through control port 17 into a volume above relay piston 14 where it acts against relay piston 14 urging it downward causing seat 28 to engage sealing surface 26 cutting off communication between delivery port 18 and exhaust port 20. Further downward movement of piston 14 urges valve spool 22 downward causing fluid pressure to communicate from supply port 16 to delivery port 18 to effect a brake application.

When the vehicle operator releases the brakes, the pressure at control port 17 is vented. Accordingly the pressure level at the delivery port 18 urges piston 14 upward permitting the sealing surface 26 of spool member 22 to reengage the inlet valve seat 24, thereby closing off communication from the supply port 16 to the delivery port 18. The exhaust valve seat 28 carried by piston 14 is then lifted off the sealing surface 26 permitting high pressure at the delivery port 18 to exhaust to atmosphere through the exhaust port 20.

According to the present invention a drain hole 40 is provided through the relay piston 14 to the exhaust port 20 to expel contaminates which may accumulate above piston 14. In a relay valve 10, without the automatic drain feature of the present invention, the top of the piston 14 is one element of a pressure tight variable size cavity. The pressurized air introduced into that cavity through the control port 17 acts on the top surface of the relay piston 14 to generate the force needed to operate the relay valve 10. Contamination may enter the cavity through the control line and port 17 and because this path, without a drain hole 40, is a dead end the contaminates tend to collect and remain in the cavity.

When there is no brake application the rubber check valve or diaphragm element 30 allows fluids to drain from the top of the relay piston 14 down through the hole 40 in the relay piston 14 and out of the relay valve exhaust port 20 to atmosphere. A very light brake application causes the check valve, formed by diaphragm element 30 and a tapered bore 44 leading to passage 40, to seal off the fluid drain path through passage 40 and prevent air leakage so the relay valve 10 will function normally.

The automatic valve drain 10 according to the present invention uses the hole 40 through piston 14 for allowing contamination to drain to the exhaust port 20. When an application of the relay valve is made, the control signal air enters the control port 17 and leaks through the drain hole 40 until a differential develops across the diaphragm valve element 30 which then deflects and seals drain hole 40, allowing the relay valve 10 to operate normally. The diaphragm element 30, as shown in FIGS. 2 and 3, has two flat areas 34 which prevent the diaphragm from sealing prematurely. Many different cut out shapes, including a simple hole through the upper resilient portion 32 could serve the same function as flat areas 34. The upper resilient portion 32 of diaphragm element 30 also serves as a spring to return the drain valve to the open position. A cylindrical protrusion 36 which extends downward from the center of the upper resilient portion 32 keeps the diaphragm element 30 in the proper orientation and location and also serves as a stop to prevent the diaphragm element 30 from over-deflecting, over stressing and premature failure.

The diaphragm element 30 is held in place by a press-in retaining ring 42. Many different methods of retention are possible as long as they allow contamination to flow to the drain hole 40. The chosen retainer ring 42, which is force fitted in the passage above the diaphragm element 30, allows the diaphragm element 30 to be removed through the opening in retainer ring 42 and replaced without removing the retaining ring 42 itself. The drain hole 40 is sized such that even if the diaphragm element 30 is missing reasonable operation of relay valve 10 will still occur.

We claim:

1. A relay valve comprising:

an inlet port;

an outlet port;

an exhaust port;

a control port;

a piston member controlling communication between said inlet port, said outlet port, and said exhaust port and in response to a pneumatic signal applied to said control port to move between a first position wherein said outlet port is in free communication with said exhaust port and a second position wherein said inlet port is in free communication with said outlet port;

drain means comprising a passage extending through said piston member to said exhaust port for draining liquids which build up on the top of said piston member; and, a check valve for sealing said passage when a pneumatic signal is applied to said control port.

2. A relay valve as claimed in claim 1 wherein said check valve comprises a flexible diaphragm member, supported in a tapered bore of said piston above said passage, which flexes when a signal is applied to said control port to securely engage the tapered bore and shut off communication through said passage.

3. A relay valve as claimed in claim 2 wherein said flexible diaphragm member comprises a bottom portion supported by a larger diameter top portion and said larger diameter top portion has some material removed to prevent said flexible diaphragm member from prematurely engaging the tapered bore and shutting off communication through said passage.

4. A valve comprising:

a supply port;

a delivery port;

a control port;

a piston controlling communication between said supply port and said delivery port in response to a pneumatic signal applied to said control port and including drain means utilizing a passage which extends through said piston to provide a path for expelling to atmosphere contaminants which may collect on the top of said piston; and check valve means for cutting off communication through said passage when a pneumatic signal is applied to said control port.

5. A valve as claimed in claim 4 wherein said check valve means comprises:

a flexible diaphragm element disposed in a tapered bore leading to said passage; and, a cylindrical protrusion extending from said flexible diaphragm element toward said passage to keep said flexible diaphragm element properly aligned.

6. A valve as claimed in claim 5 further comprising:

a retainer for preventing said flexible diaphragm element from moving out of said tapered bore; and, part of said flexible diaphragm element is removed to prevent said check valve means from prematurely sealing.

7. A valve as claimed in claim 5 further comprises:

a retainer for preventing said flexible diaphragm element from moving out of said tapered bore; and, said flexible diaphragm element includes a larger diameter portion from which some material on the outer diameter perimeter is removed to define at least one flat surface to prevent said check valve means from prematurely sealing.

8. A relay valve comprising:

an inlet port;

an outlet port;

an exhaust port;

a control port;

a piston member controlling communication between said inlet port, said outlet port, and said exhaust port and being responsive to a pneumatic signal applied to said control port to move between a first position wherein said outlet port is in free communication with said exhaust port and a second position wherein said inlet port is in free communication with said outlet port;

a drain comprising a passage formed in a low portion of said piston member and extending through said piston member to said exhaust port for draining contaminants which may build up on the top of said piston member;

a tapered bore in the top of said piston member leading to said passage;

a flexible generally circular diaphragm element disposed in said tapered bore for engaging and sealing against said tapered bore when a pneumatic signal is applied to said control port.

9. A relay valve as claimed in claim 8 comprising a retainer for keeping said diaphragm element in said tapered bore and wherein portions of the outer diameter of said diaphragm are removed to prevent said diaphragm from premature sealing.

* * * * *